(12) United States Patent
Lykke et al.

(10) Patent No.: US 8,557,357 B2
(45) Date of Patent: Oct. 15, 2013

(54) PACKAGING MATERIAL WITH INTEGRATED PRESSURE RELIEF VALVE

(75) Inventors: Kirsten Lykke, Silkeborg (DK); Peter Hansen, Vejle Ost (DK)

(73) Assignee: Amcor Flexibles Transpac B.V.B.A., Zaventem (BE)

( * ) Notice: Subject to any disclaimer, the term of this patent is extended or adjusted under 35 U.S.C. 154(b) by 0 days.

(21) Appl. No.: 13/382,429

(22) PCT Filed: Jul. 2, 2010

(86) PCT No.: PCT/EP2010/059470
§ 371 (c)(1),
(2), (4) Date: Feb. 16, 2012

(87) PCT Pub. No.: WO2011/003831
PCT Pub. Date: Jan. 13, 2011

(65) Prior Publication Data
US 2012/0196060 A1 Aug. 2, 2012

(51) Int. Cl.
*B32B 3/10* (2006.01)
*B32B 3/20* (2006.01)
*B32B 3/26* (2006.01)
*B32B 9/04* (2006.01)
*B32B 1/02* (2006.01)

(52) U.S. Cl.
USPC ....... 428/35.2; 428/35.4; 428/35.7; 428/36.6; 428/137; 428/188; 428/321.1; 428/411.1

(58) Field of Classification Search
USPC ........... 428/34.1, 34.4, 34.6, 34.7, 35.2, 35.3, 428/35.4, 35.7, 35.8, 35.9, 36.4, 36.6, 36.7, 428/36.9, 131, 137, 188, 221, 320, 321.1, 428/323, 325, 327, 331, 357, 411.1, 500, 428/515, 517, 521
See application file for complete search history.

(56) References Cited

U.S. PATENT DOCUMENTS
4,134,535 A  1/1979 Barthels et al.

FOREIGN PATENT DOCUMENTS
EP         0729898       4/1996
WO    WO 2004048225     6/2004

OTHER PUBLICATIONS

International Search Report in PCT/EP2010/059470, mailed Aug. 5, 2010.
International Preliminary Report on Patentablility in PCT/EP2010/059470, completed Dec. 12, 2011.

*Primary Examiner* — Walter B Aughenbaugh
(74) *Attorney, Agent, or Firm* — Cooper & Dunham LLP (57) ABSTRACT

A packaging material for forming at least a part of a package for a product releasing gasses comprises a one-way pressure relief valve (18) including a first inner film (10), being provided with at least one inlet opening (13, 14) therethrough, and a second outer film (11) covering the at least one inlet opening (13, 14) and being bonded to the first inner film (10) to form a channel portion (12) between the inner and the outer film. The channel portion (12) communicates with the surroundings of the package through at least one outlet opening (15) spaced apart from the at least one inlet opening (13, 14). The pressure relief valve (18) further comprises a liquid (19) provided in the channel portion (12) and solid spacer means (17) provided in the channel portion (12) proximate to the at least one inlet opening (13, 14). The outer film (11) is a soft film having such a flexibility or elasticity that in a tensile test a force of less than 5 N is needed for elongating a test piece thereof having a width of 15 mm by 5%.

24 Claims, 5 Drawing Sheets

PACKAGING MATERIAL WITH INTEGRATED PRESSURE RELIEF VALVE

TECHNICAL FIELD

The present invention relates to a packaging material for forming at least a part of a package for a product releasing gasses, especially a food product, and being provided with an integral, normally closed pressure relief valve opening at a predetermined excess pressure, said pressure relief valve including a first inner film, preferably a polymer film, to be an inner film of the package and being provided with at least one inlet opening therethrough, and a second outer film, preferably a polymer film, to be an outer film of the package and covering the inlet opening in the first inner film and being bonded to the first inner film to form a channel or pocket portion between the first inner and the second outer film, said channel or pocket portion communicating with the surroundings of the package through at least one outlet opening spaced apart from the inlet opening, the first inner film having a first surface and a second surface and the second outer film having a first surface and a second surface, the second surface of the first inner film facing the second surface of the second outer film, said pressure relief valve further comprising a liquid provided in the channel or pocket portion and solid spacer means provided in the channel or pocket portion proximate to the inlet opening, said spacer means providing an interspace between the second surface of the first inner film and the second surface of the second outer film.

The word "film" should be understood in its widest sense, as it covers mono films, multilayered co-extrudates and laminates.

The word "opening" should also be understood in its widest sense, as it covers slits formed by a knife, perforations or holes made by means of a needle and punched out or laser cut perforations of various shapes.

BACKGROUND

Packages and/or packaging materials having a pressure relief valve are known from EP 0144 011 B2, EP 0 559 598 B1, WO 88/07479, DE 25 37 317 A1, EP 0 023 703 B1, EP 0 738 227 A1, DE 44 35 492 A1, EP 0 760 790 B1, WO 2004/048225 A1 and WO 2006/012282 A1. EP 0144 011 B2, EP 0 559 598 B1, WO 88/07479, WO 2004/048225 A1 and WO 2006/012282 A1 all disclose packaging materials wherein a liquid film and spacer means may be provided in the channel region between the first inner film and the second outer film.

It should further be noted that in general flexible packaging materials are provided with an outer oriented film, such as an OPP (oriented polypropylene), OPA (oriented polyamide) or PET (polyethylene terephthalate) as suggested in WO 2004/048225A1 in order to provide the outer film with a print. However, when using such films for the outer film in a packaging material with an integral valve, the opening pressure of the valve is rather high due to the stiffness or comparatively low elasticity of these films.

DISCLOSURE OF THE INVENTION

An object of the present invention is to provide a packaging material having an integral one-way pressure relief valve with a low opening pressure.

A further object of the invention is to provide a packaging material including an integral one-way pressure relief valve with a reliable and reproducible opening pressure.

The packaging material according to the invention is characterised in that the second outer film is a soft film having such a flexibility or elasticity that in a tensile test a force of less than 5 N is needed for elongating a test piece thereof having a width of 15 mm by 5%, the tensile test being carried out according to ISO 527/ASTM D 638, wherein a test piece of a width of 15 mm is gripped between two sets of jaws being interspaced by exactly 100 mm and pulled in tension at a speed of 100 mm/min and at a 5% elongation, i.e. 5 mm, the force is registered.

When the packaging material is not subjected to an excessive internal pressure or subjected to a minor pressure, the pressure relief valve remains its normally closed position, wherein the liquid in the channel or pocket portion provides adhesiveness between the inner film and the outer film so as to prevent an open connection between the inlet opening and the outlet opening. In the closed position of the valve ambient air is also prevented from penetrating from the outlet opening to the inlet opening and thereby into the interior of a package of which at least a part is formed of the packaging material. When the pressure in the package increases due to gasses being released from the packed product and reaches the predetermined excess pressure, the outer film is forced away from the inner film and the adhesiveness of the liquid film is reduced to provide an open connection between the inlet opening and the outlet opening. As a result, the excess pressure is relieved until a closing pressure is obtained allowing the outer film to flex back into the closed position of the valve, thereby preventing air from the ambience to penetrate into the interior of the package through the outlet opening, the channel portion and the inlet opening.

Especially the elasticity of the outer film allows for an opening of the valve at a low excess pressure and a reliable closure of the valve at a pressure being lower than the predetermined excess pressure. Tests have shown that it is possible to provide an opening pressure of less than 4 mbar and a reliable closing of the valve when the excess pressure has been relieved by venting of generated gasses through the valve. The tensile tests have been carried out on an Instron 5564.

Additionally it should be noted that flexible packages, i.e. packages being formed entirely of the packaging material, such as flexible bags subjected to rough handling during packing at the factory and later when they are unpacked at a shop. Due to its softness and flexibility the outer film is able to follow the inner film during rough handling and thereby maintains the functionality of the valve of the packaging material.

According to the invention the force needed to elongate the test piece of the second film by 5% is less than 4N, alternatively less than 3N, alternatively less than 2N, alternatively less than 1.5 N and optionally less than 1N. A decrease in the force needed for elongating the test piece by 5% allows for a decrease of the opening pressure of the valve, i.e. allows for a very low opening pressure of the valve.

Further, according to the invention the packaging material may comprise small air pocket adjacent the spacer means in the channel portion and proximate to the at least one inlet opening.

The air pockets decrease the excess pressure necessary for opening the valve. Without being bound to the theory, it is meant that these air pockets reduce the adhesiveness of the liquid and thereby allowing for a lower opening pressure of the valve.

The air pockets are formed by subjecting the packaging material to a pressure in the region of the valve, especially in the region of the spacer means, so as to elastically deform the outer film and subsequently release the pressure, whereby the outer film at least partly moves away from the inner film due to its elasticity and thereby forms air pockets adjacent the spacer means. Further the outer film is slightly plastically deformed in the areas where it has been pressed against the spacer means.

In practice, the air pockets may be formed when a web of packaging material in connection with the manufacture thereof is wound up into a roll and subsequently in connection with longitudinal cutting is unwound and rewound to form a roll of packaging material with a width intended for the package for which the packaging material is to be used.

Moreover, according to the invention the spacer means may provide an interspace of between 10-100 µm, especially of between 20-60 µm, between the second surface of the second outer film and the second surface of the first inner film.

According to an embodiment of the invention the spacer means are small particles of a solid matter arranged in the channel or pocket portion.

According to a further embodiment of the invention, the spacer means are one or more one small protrusions protruding from the second surface of the first inner film. As the protrusions form an integral part of the inner film, it is advantageously possible to select the exact position and number of protrusions, i.e. spacer means, in the channel or pocket portion. This is not possible when using particles, as the amount and position of particles are impossible to control exactly. Further, the position and the shape of the protrusions may be selected so as to obtain the desired opening pressure. Preferably the at least one protrusion is punctiform or linear.

According to the invention at least one of the small protrusions may be a protrusion of deposited matters, such as vacuum-deposited aluminium, deposited on the second surface of the first inner film or a protrusion of printed matters, such as printing ink, printed on the second surface of the first inner film.

Further, according to the invention at least one of the small protrusions may also be a protruding rim of a bottom hole or groove formed in the second surface of the first inner film, especially a protruding rim formed by a laser beam. Such a protruding rim is automatically formed when the bottom hole or groove is formed by a laser beam, as the protruding rim is formed when the laser beam melts the inner polymer film.

Further, according to the invention at least one of the small protrusions may a protruding rim of the at least one inlet opening formed in the first inner film, especially a protruding rim formed by a laser beam. Such a protruding rim is automatically formed when the inlet opening is formed by a laser beam penetrating the first inner film from the second surface.

According to a further embodiment of the invention the at least one outlet opening may be defined of at least one edge of at least the second outer film.

According to a further embodiment of the invention the at least one outlet opening may be an opening through the outer film.

The at least one inlet opening can be a proper opening having a lumen, i.e. a throughgoing hole.

In order to prevent the product to be packed from entering the channel portion, the at least one inlet opening may have a diameter smaller than any constituents of the product to be packed. When the product to be packed is a granular or powder material, the diameter of the at least one inlet opening may be smaller than the smallest particles of the said product. Thus, the at least one inlet opening can have a diameter of between 50 µm and 500 µm, optionally of between 100 µm and 300 µm and optionally of between 150 µm and 200 µm. However, it should be noted that the at least one inlet opening also can have a diameter exceeding 500 µm depending on the product to be packed. When the product to be packed is ground coffee, the diameter of the at least one inlet opening is smaller than 200 µm, alternatively smaller than 150 µm.

The first inner film may be provided with two or more slightly interspaced inlet openings, e.g. being interspaced by 0.1-2.0 mm, especially by 0.2-1.0 mm. Thus, the first inner film may be provided with five, nine, eleven or more openings. Five and nine openings may be arranged so as to form an X. Optionally, the number of slightly interspaced openings may be arranged in various patterns.

When the first inner film is provided with a number of small openings, such as openings having a diameter of 50-300 µm, preferably they are arranged within an area of 5 mm×5 mm, alternatively of 4 mm×4 mm, alternatively of 3 mm×3 mm, alternatively of 2 mm×2 mm and alternatively of 1 mm×1 mm.

By increasing the number of small inlet openings, the opening pressure of the valve may be reduced. Correspondingly, the opening pressure of the valve may be reduced by using large openings. However, a number of small openings is preferred at present.

According to an additional embodiment of the invention the interspace between any inlet opening and any outlet opening may be between 2 and 40 mm, alternatively between 2 and 25 mm and alternatively between 2 and 10 mm.

According to a further embodiment of the invention the second surface of the second outer film and the second surface of the first inner film may be laminated to each other except in an unlaminated area forming the channel or pocket portion. The inner and outer film may be co-extensive. However, the outer film may also be of smaller width than that of the inner film, whereby the amount of packaging material is reduced.

The second outer film may be a label covering a limited region of the first inner film, preferably a region of a size being substantially smaller than the size of the first inner film.

According to an embodiment of the invention, the label is sealed to the second surface of the first inner film along two mutually interspaced sealing lines so as to form a channel therebetween, the at least one outlet opening being formed of at least one edge of the label.

Optionally, the label may be sealed to the second surface of the first inner film along a closed sealing line, the at least one outlet opening being formed in the second outer film inside the closed sealing line.

The label may be sealed to the first inner film by adhesion.

The label may have a rectangular outline with a length (L) and a width (W) less than 100 mm, preferably less than 80 mm, and especially less than 60 mm. Excellent results have been obtained with a label having a length of 40 mm and a width of 20 mm.

The outer film may be a film formed of or comprising polyethylene (PE), especially linear density polyethylene (LDPE), linear low density polyethylene (LLDPE) or ultra-low density polyethylene (ULDPE) or a PE-EVOH-PE film, i.e. a co-extruded film having a core layer of polyvinyl alcohol (PVOH) and a layer polyethylene (PE) on each side thereof or polypropylene (PP), amorf polyamide (amorf PA) or an elastomer, especially a thermoplastic elastomer (TPE) or a hot melt, such as a EVA (ethylene vinyl acetate)-based or PA (polyamide)-based hot melt. An example of a PA-based hot melt is VP 9676 available from Henkel GmbH and an example of an EVA-based hot melt is VP 0332 available from Henkel GmbH.

Depending on the elasticity of the film, the thickness of the outer film may be between about 10 µm and 200 µm, a force of less than 5N still being needed to elongate the specified test piece by 5%.

The first inner film may advantageously comprise an essentially gas-imperious layer, such as a metallisation layer.

The outer film may also comprise an essentially gas-imperious layer. An example of such a layer is an EVOH layer. Thus, the outer film may be a PE-EVOH-PE film.

Finally, the present invention relates to a package for a product, especially a food product, releasing gasses, wherein at least a part thereof is formed of a packaging material according to the invention.

The packaging material according to the invention may be used as a lid for a container such as a bowl and for forming a flexible package, such as a bag, in its entirety.

BRIEF DESCRIPTION OF THE DRAWING(S)

Below the invention is described with reference to the accompanying drawings, in which.

DETAILED DESCRIPTION OF THE INVENTION

Figure 1:
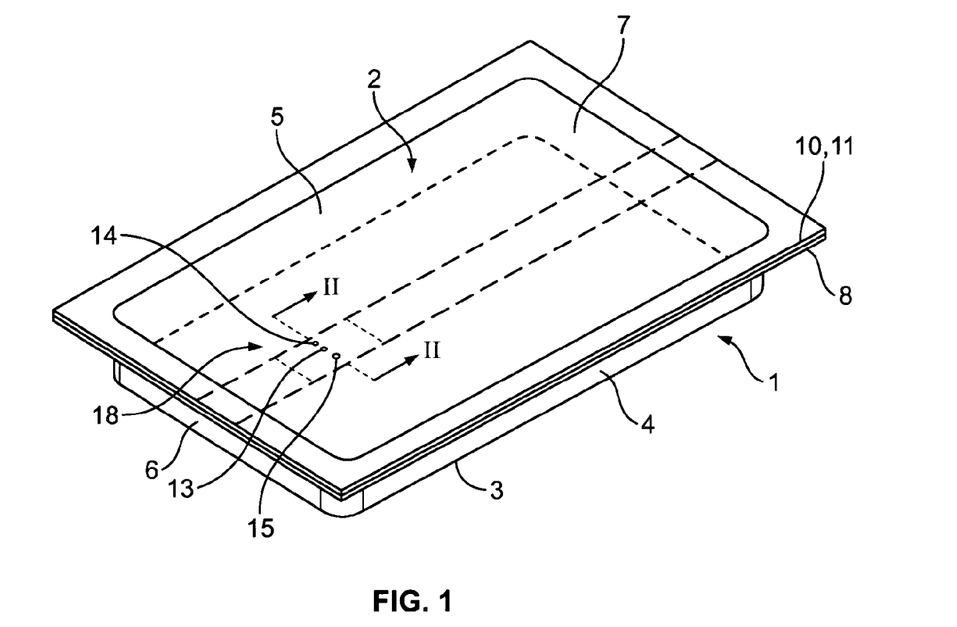
FIG. 1 is an isometric view of package comprising a lid formed of a first embodiment of a packaging material according to the invention.
Figure 2:
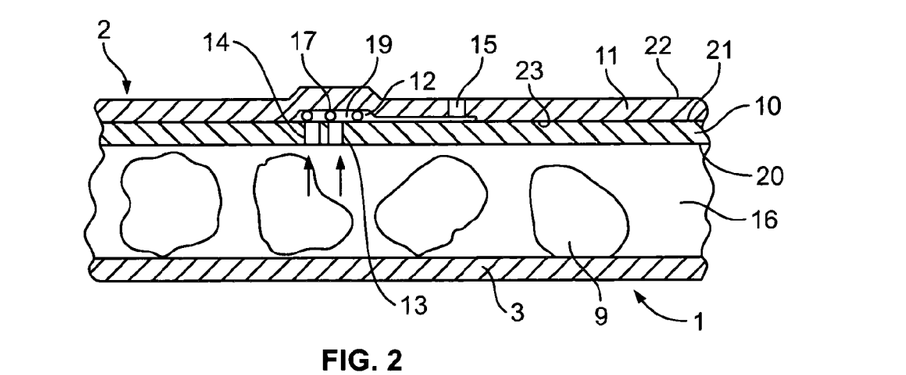
FIG. 2 is an enlarged sectional view along the line II-II in FIG. 1.

The package shown in FIGS. 1 and 2 includes a bowl-shaped lower part 1 and planar cover part or lid 2, the latter being formed of packaging material according to a first embodiment of the invention.

The lower part is rectangular and includes a bottom 3. Two pairs of opposing lateral walls 4, 5 and 6, 7 extend upwardly from the bottom 3. At their upper ends the lateral walls continue into a common flange 8. The lower part is typically made from polypropylene (PP) and made by thermoforming or injection moulding.

The planar cover part 2 is sealed to the flange of the lower part 1 to form a closed inner chamber 16 in which a food product releasing gasses is housed. For reason of clarity the food product is not shown in FIG. 1 but only in FIG. 2. The packaging material from which the cover part 2 is formed comprises a first inner film 10 having a first surface 20 and a second surface 21, and a second outer film 11 having a first surface 22 and a second surface 23. The two films are laminated to each other second surface against second surface in their entirety except in an unlaminated area extending in the machine direction and forming a narrow channel portion 12 between the inner and outer films 10, 11.

One example of the inner film 10 of the packaging material is the laminate co-ex OPP 20/metallised PETP 12/PE 60, wherein co-ex OPP 20 denotes a 20 µm thick coextruded, oriented polypropylene film comprising a core layer of polypropylene and thin sealing layers on each side thereof. PETP denotes a 12 µm thick polyester film and PE 60 denotes a 60 µm thick polyethylene film.

The outer film 11 is an elastic or flexible film and one example thereof is a 40 µm thick film of linear low density polyethylene (LLDPE). The force needed to elongate a test piece of this film having a width of 15 mm in a tensile test is 2.9 N.

Two parallel and mutually interspaced inlet openings 13, 14 are provided in the inner film 10 in the unlaminated channel portion 12. An outlet opening 15 is provided in the outer film 11 in the unlaminated channel portion 12. The outlet opening 15 in the outer film 11 is spaced apart from the inlet openings 13, 14 in the inner film 10. The openings 13, 14, 15 are arranged in line as best seen in FIG. 1.

The inlet openings 13, 14 in the inner film 10 thus form a connection between the channel portion 12 and the inner chamber 16 of the package. Correspondingly the outlet opening 15 in the outer film 11 forms a connection between the channel portion 12 and the surroundings.

A liquid in form a silicon oil 19 containing small particles 17 is provided in the channel portion 12 adjacent the inlet openings 13, 14. In the channel portion 12 adjacent the outlet opening 15 silicon oil without particles is provided. The particles 17 keep the inner and outer films 10, 11 slightly spaced apart while the silicon oil prevents an open connection between inlet openings 13, 14 and the outlet opening 15. A one-way pressure relief valve 18 is thus provided by means of the channel portion 12, the inlet openings 13, 14, the outlet opening 15, silicon oil 19 and the particles 17. In its closed position the valve 18 prevents ambient air from entering the inner chamber 16 of the package as shown in FIG. 2. However, the valve 18 is caused to open when a specific excess pressure is generated in the inner chamber 16 of the package by the packed food product 9. When the specific excess pressure is generated, the outer film 11 is deformed slightly and is lifted slightly away from the particles 17. The adhesiveness of the liquid is thereby reduced and the outer film is moved further away from the inner film due to the gas pressure. As a result, the gasses may escape from the inner chamber 16 of the package through the inlet openings 13, 14, the channel portion 12 with the silicon 19 and the particles 17 and out through the outlet opening 15. The inner pressure is thereby reduced and the valve closes sealably to prevent ambient air from entering the inner chamber 16 of the package through the outlet opening, the channel portion and the inlet openings. The reliable closure of the valve is due to the elasticity or flexibility of the outer film 11 and the adhesiveness of the silicon oil 19 allowing the outer film 11 to move or flex back to its closed position.

In respect to the above first embodiment it should be noted that instead of providing the unlaminated area as a channel portion, it could also be provided as a pocket as shown by means of dotted lines in FIG. 1.

Further, in respect to the above first embodiment it should be noted that instead of using particles as spacer means, it is possible as spacer means to use one or more protrusions protruding from the second surface of the first inner film and forming an integral part of the inner film as disclosed in the following second to fourth embodiment of the packaging material.

Figure 3:
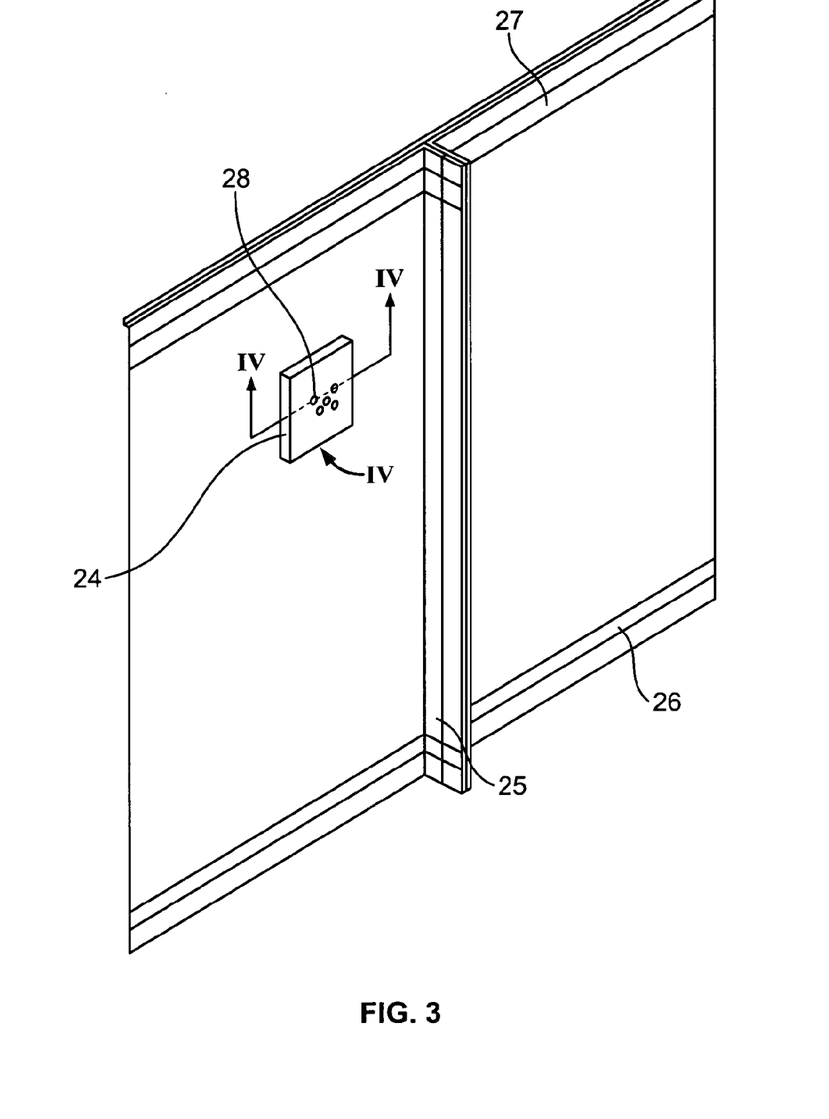
FIG. 3 is an isometric view of a bag made of a second embodiment a packaging material according to the invention.
Figure 4A:
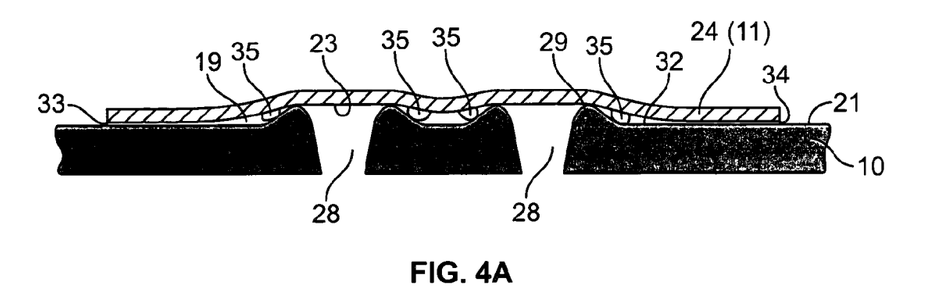
FIGS. 4a-4d are enlarged sectional views along the line IV-IV in FIG. 3 illustrating the function of the one-way pressure relief valve integrated in the packaging material according to the invention.
Figure 4B:
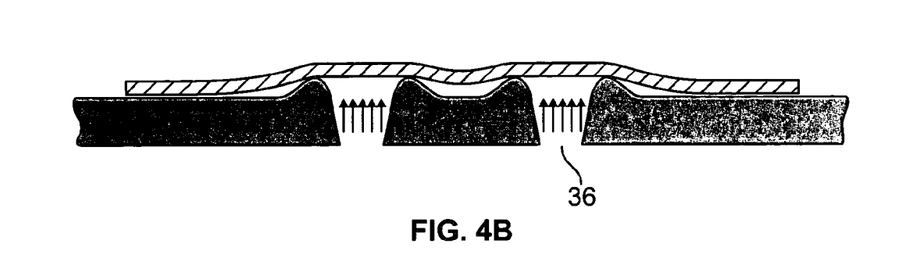
Figure 4C:
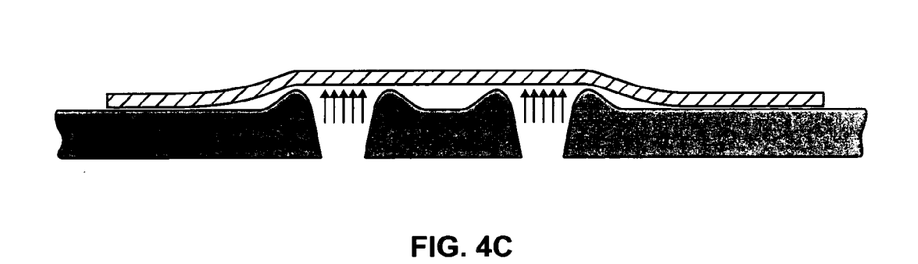
Figure 4D:
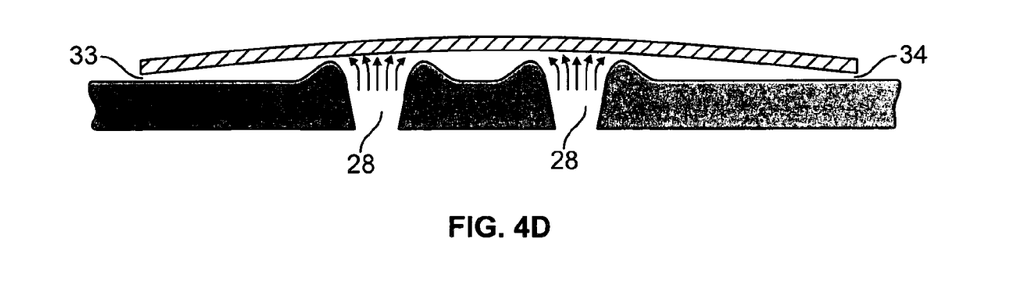
Figure 5:
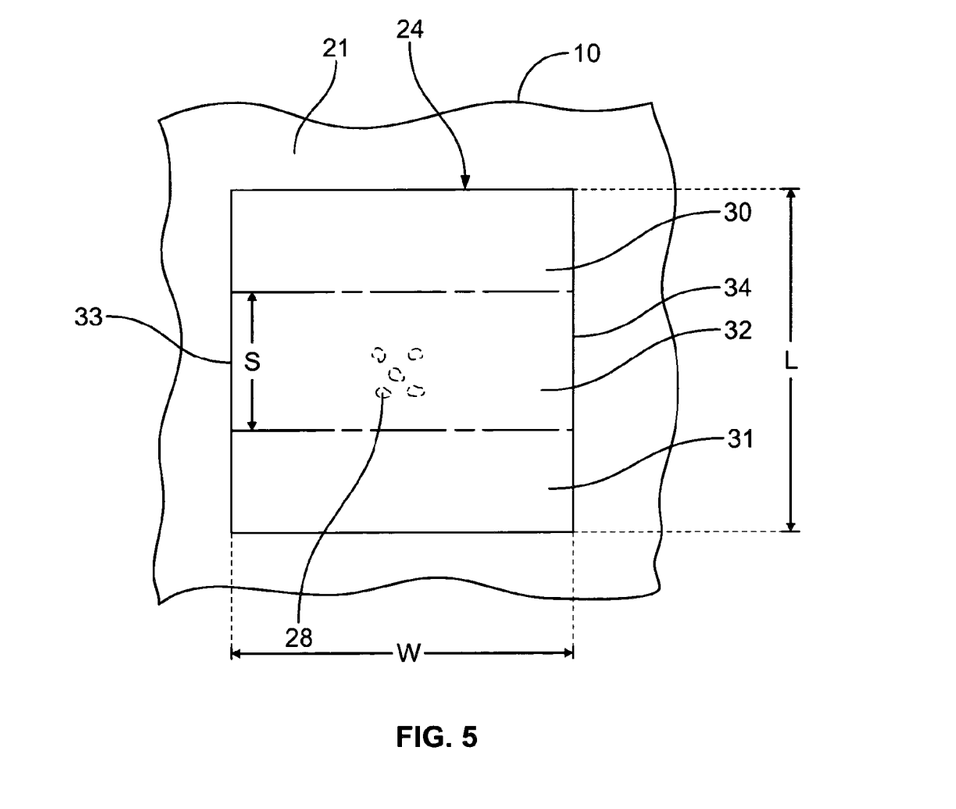
FIG. 5 shows a section of the packaging material seen in the direction of the arrow V in FIG. 3.

FIGS. 3-5 illustrate a flexible package in the form of a bag formed in its entirety of a packaging material according a second embodiment of the invention. The second embodiment of the packaging material comprises an inner film which as an example may be an inner film 10 identical to that used in the above first embodiment of the packaging material. In other words, the inner film is the laminate co-ex OPP 20/metallised PETP 12/PE 60.

The packaging material further comprises an outer film which as an example may be an outer film 11 identical to that used in the above first embodiment of the packaging material. In other words, the outer film is a 40 μm thick film of linear low density polyethylene (LLDPE). However, the outer film is a label 24 covering a limited region of the first inner film 10, said region being of a size substantially smaller than the size of the first inner film 10, as clearly illustrated in FIG. 3.

Before describing the structure of the second embodiment of the packaging material and the pressure relief valve thereof in details, it should be noted that the bag formed by the packaging material in known manner has a back seal 25, a bottom seal 26 and a top seal 27. The said three seals 25, 26, 27 are shaped as fin seals, i.e. the packaging material is sealed inner face to inner face (PE 60 against PE 60). The seals provide a sealed inner chamber 28 housing a food product releasing gasses. The food product is not shown in FIGS. 3-5.

Now reverting to the structure of the packaging material, the inner film 10 is provided with five inlet openings 28 arranged as the pips of the five side of a dice, i.e. so as to form an X. As an example each of the inlet openings 28 may have a diameter of about 150 μm and interspaced by about 0.75 mm. The inlet openings 28 are cut by means of laser beam from the second surface 21 of the inner film 10, whereby a small protrusion 29 is automatically formed along the rim of the inlet opening 28 when the laser beam melts the inner polymer film 10.

The label 24 is connected to the second surface 21 of the inner film 10 along strip-shaped connection areas 30, 31 at opposite edge portions of the label 24, as it most clearly appears from FIG. 5. A channel portion 32 is thus formed between the strip-shaped connection areas 30, 31 and the second surface 21 of the inner film 10 and the second surface 23 of the label 24 formed of the outer film 11. The channel portion 32 is open at opposite edges of the label 24 between the strip-shaped connection areas 30, 31, whereby outlet openings 33, 34 are defined at said opposite edges of the label 24 formed by the second outer film 11, confer especially FIG. 5.

Reference is now made especially to FIG. 4 illustrating that the small protrusions 29 form spacer means between the label 24 and the inner film 10 in the channel portion 32 of the packaging material. Further, a liquid such as silicon oil 19 is provided in the channel portion 32. As an example, the silicon oil 19 may be a viscosity of 1000 cps. Additionally, small air pockets 35 are provided adjacent the small protrusions 29 in the channel portion 32 and proximate to the inlet openings 28. As described above, these small air pockets 35 are provided by subjecting the packaging material to a pressure in the region of the pressure relief valve formed by the label 24, the inner film 10, the protrusions 29, the silicon oil 19, the inlet openings 28 and the outlet openings 33, 34.

In FIG. 4a the valve is shown in its closed position in which the adhesiveness of the silicon oil 19 prevents a connection between the inlet openings 28 and the outlet openings 33, 34.

FIG. 4b illustrates the situation where a pressure is generated in the interior of the package due to the gasses released by the packed product. The gasses push on the label through the inlet openings as shown by means of the arrows 36. However, the valve is still fully closed.

FIG. 4c illustrates the situation where the inner pressure has increased further and the valve begins to open and the label 24 around the inlet openings 28 is free from the adhesive force of the silicon oil 19 and lifted slightly away from the small protrusions 29.

Finally, FIG. 4d illustrates the situation where the pressure has increased still further and has reached a predetermined excess pressure. The valve is now fully opened and the gasses are allowed to escape from the interior of the package through the inlet openings 28 along the channel portion 32 and out to the surroundings through the outlet openings 33, 34, as indicated by means of the arrows.

In the above embodiment the opening pressure of the valve is 8-9 mbar and the closing pressure is a couple of mbar lower.

In a first modification of the above second embodiment the inner film is provided with nine laser-cut through holes having a diameter of 150-200 μm and being arranged so as to form an X within an area of about 2 mm×2 mm.

The outer film label is a 50 μm thick EVA-based film (VP-0332 available from Henkel GmbH) having a length L of 40 mm and a width W of 20 mm.

The area with the holes is provided centrally between the strip-shaped connection areas 30, 31 and centrally between the outlet openings 33, 34. The spacing S between the strip-shaped connection areas 30, 31 is about 18 mm and the area with the holes is interspaced by 8 mm from the outlet openings 33, 34.

In the above first modification, the opening pressure is about 9 mbar and the closing pressure a couple of mbar lower.

In a second modification identical to the first modification expect that the outer film label is a 30 μm thick PA-based hot melt (VP 9676 available from Henkel GmbH).

In the above second modification the opening pressure is about 7 mbar and the closing pressure a couple of mbar lower.

Comparative tests have been carried out with a valve structure identical to the above first and second modification of the second embodiment of the packaging material according to the invention with the exception that the outer film label was a 20 μm thick OPP-, OPA- or PETP-based film. The force required to elongate the specified test piece of these films by 5% was between about 10-20N and the opening pressure was about 20-27 mbar.

A comparison of the opening pressure of the above embodiments of the invention with the opening pressure in the above comparative tests clearly demonstrates that a considerably lower opening pressure, desirably an opening pressure below 10 mbar, is obtained with a packaging material according to the invention having an elastic outer film being elongated at least 5% by a force of 5N in the specified tensile test than by using the less flexible films generally used as the outer film of a packaging material having an integral vent valve.

Figure 6:
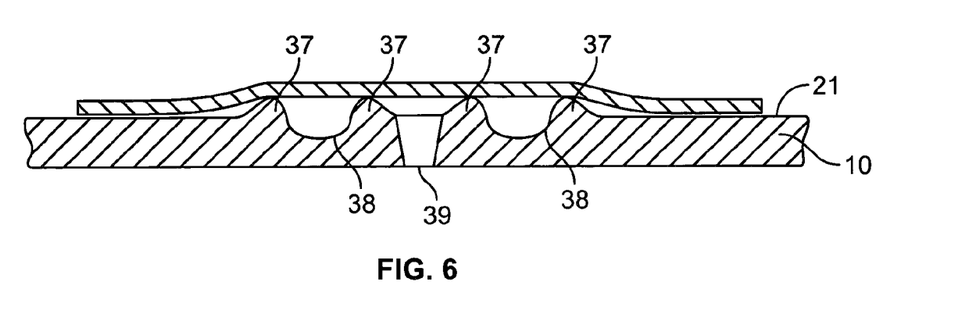
FIG. 6 is an enlarged sectional view corresponding to that in FIG. 4 through a third embodiment of the packaging material according to the invention.

In the third embodiment of the packaging material according to invention shown in FIG. 6, the spacer means on the second surface 21 of the inner film 10 are formed by protruding rims of bottom holes or grooves formed in the second surface 21 of the inner film 10. The protruding rims 37 are provided by forming the bottom holes or grooves 38 by means of a laser beam directed against the second surface 21 of the inner film 10. Additionally, the inner film 10 is provided with at least one inlet opening 39. In other respects, the third embodiment of the packaging material corresponds essentially to the second embodiment described above, for which reason further description thereof and of the function of the pressure relief valve integrated therein is omitted.

Figure 7:
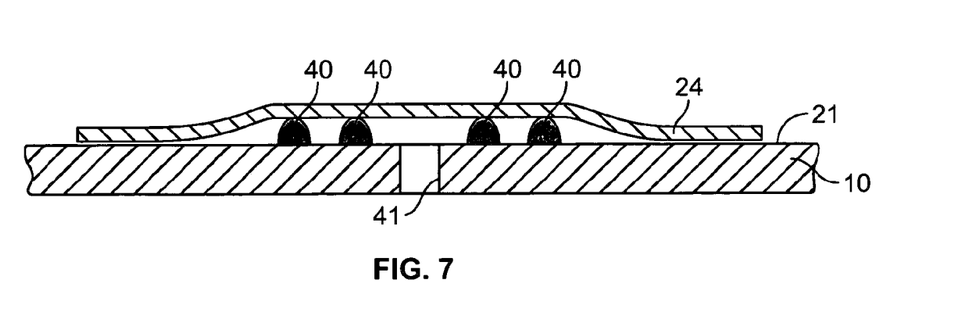
FIG. 7 is an enlarged sectional view corresponding to that in FIG. 4 through a fourth embodiment of the packaging material according to the invention.

In the fourth embodiment of the packaging material according to invention shown in FIG. 7, the spacer means on the second surface 21 of the inner film 10 is provided by means of protrusions 40 protruding from the second surface 21 of the inner film 10 and being formed by a printed matter, such as printing ink, printed on the second surface 21 of the inner film 10 or deposited matter, such as aluminium vacuum deposited on the second surface 21 of the inner film 10. The protrusions 40 are punctiform or linear. Further the inner film 10 is provided with at least one inlet opening 41 connecting the interior of package formed by the packaging material with the channel portion. In other respects the structure of the packaging material according to fourth embodiment corresponds essentially to that of the second embodiment described above. Also the function of the pressure relief valve integrated therein is essentially the same as described above with reference to the second embodiment. For this reason further description of the packaging material structure and the function of the valve are omitted.

Additionally, it should be noted that although the above described second, third and fourth embodiments have outlet openings defined at outer edges of the label formed of the outer film, these embodiments may also be incorporated into other embodiments of the packaging material having at least one outlet opening formed as a through-going opening, as described with reference to the first embodiment of the invention.

| List of reference numbers | |
|---|---|
| 1 | Bowl-shaped lower part |
| 2 | Planar cover part |
| 3 | Bottom |
| 4, 5-6, 7 | Two pairs of opposite lateral walls |
| 8 | Common flange |
| 9 | Food product |
| 10 | First inner film |
| 11 | Second outer film |
| 12 | Narrow channel portion |
| 13 | Inlet opening in inner film |
| 14 | Inlet opening in inner film |
| 15 | Outlet opening in outer film |
| 16 | Closed inner chamber |
| 17 | Particles |
| 18 | One-way pressure relief valve |
| 19 | Silicon oil |
| 20 | First surface of inner film 10 |
| 21 | Second surface of inner film 10 |
| 22 | First surface of outer film 11 |
| 23 | Second surface of outer film 11 |
| 24 | Label |
| 25 | Back seal |
| 26 | Bottom seal |
| 27 | Top seal |
| 28 | Inlet opening |
| 29 | Small protrusions |
| 30, 31 | Strip-shaped connection areas |
| 32 | Channel or pocket portion |
| 33, 34 | Outlet opening |
| 35 | Air pockets |
| 36 | Arrows |
| 37 | Protruding rims |
| 38 | Bottom holes or grooves |
| 39 | Inlet opening |
| 40 | Protrusions |
| 41 | Inlet opening |

The invention claimed:

1. Packaging material for forming at least a part of a package for a product releasing gasses and being provided with an integral, normally closed pressure relief valve (18) that opens at an excess of pressure within the package overpressure outside the package, said pressure relief valve including a first inner film (10) preferably a polymer film, to be an inner film of the package and having at least one inlet opening (13,14; 28: 39: 41), and a second outer film (11) to be an outer film of the package and covering the inlet opening in the first inner film (10) and being bonded to the first inner film (10) to form a channel or pocket portion (12; 32) between the first inner and the second outer film, said channel or pocket portion (12; 32) communicating with the surroundings of the package through at least one outlet opening (15; 33, 34) spaced apart from the inlet opening, the first inner film (10) having a first surface (20) and a second surface (21) and the second outer film (11) having a first surface (22) and a second surface (3), the second surface (21) of the first inner film (10) facing the second surface (23) of the second outer film (11), said pressure relief valve (18) further comprising a liquid (19) provided in the channel or pocket portion and solid spacer means (17; 29: 37; 40) provided in the channel or pocket portion proximate to the inlet opening (13, 14; 28; 39; 41), said spacer means providing an interspace between the second surface (21) of the first inner film (10) and the second surface (23) of the second outer film (11), wherein the second outer film (11) is a film having such a flexibility or elasticity that in a tensile test a force of less than 5N is needed for elongating a test piece thereof having a width of 15 mm by 5%, the tensile test being carried out according to ISO 527/ASTM D 638, wherein a test piece of a width of 15 mm is gripped between two sets of jaws interspaced by exactly 100 mm and pulled in tension at a speed of 100 mm/min and at 5% elongation, i.e. 5 mm, the force is registered.

2. Packaging material according to claim 1, wherein the force needed to elongate the test piece of the second film by 5% is less than 4N, alternatively less than 3N, alternatively less than 2N, alternatively less than 1.5N and alternatively less than 1N.

3. Packaging material according to claim 1, wherein the packaging material comprises air pockets (35) adjacent the spacer means in the channel or pocket portion and proximate to the at least one inlet opening.

4. Packaging material according to claim 1, wherein the spacer means provide an interspace of between 10-100 μm between the second surface (23) of the second outer film (11) and the second surface (21) of the first inner film (10).

5. Packaging material according to claim 1, wherein the spacer means are particles (17) of a solid matter arranged in the channel or pocket portion (12).

6. Packaging material according to claim 1, wherein the spacer means are one or more protrusions (29; 37; 40) protruding from the second surface (21) of the first inner film (10).

7. Packaging material according to claim 6, wherein at least one of the protrusions is a protrusion of deposited matters deposited on the second surface of the first inner film or a protrusion (40) of a printed matter printed on the second surface (21) of the first inner film (10).

8. Packaging material according to claim 6, wherein at least one of the protrusions is a protruding rim (37) of a hole or groove (38) formed in the second surface (21) of the first inner film (10).

9. Packaging material according to claim 6, wherein at least one of the protrusions is a protruding rim (29) of the at least one inlet opening (28) formed in the first inner film (10).

10. Packaging material according to claim 1, wherein the at least one outlet opening (33, 34) is defined of at least one edge of at least the second outer film (11).

11. Packaging material according to claim 1, wherein the at least one outlet opening is an opening (15) through the outer film (11).

12. Packaging material according to claim 1, wherein the at least one inlet opening is a proper opening with a lumen, i.e. a through hole.

13. Packaging material according to claim 1, wherein the at least one inlet opening has a diameter smaller than any constituent of the product to be packed in the packaging material.

14. Packaging material according to claim 1, wherein the first inner film is provided with a number of interspaced inlet openings.

15. Packaging material according to claim 1, wherein the at least one inlet opening has a diameter of between 50 μm and 500 μm, optionally of between 100 μm and 300 μm, and optionally of between 150 μm and 200 μm.

16. Packaging material according to claim 14, wherein the number of inlet openings is arranged within an area smaller than 5 mm×5 mm, optionally 4 mm×4 mm, optionally 3 mm×3 mm, optionally 2 mm×2 mm, and optionally 1 mm×1 mm.

17. Packaging material according to claim 1, wherein the interspace between the inlet opening and the outlet opening is between 2 and 40 mm, alternatively between 2 and 25 mm and alternatively between 2 and 10 mm.

18. Packaging material according to claim 1, wherein the second surface (23) of the second outer film (11) and the second surface (21) of the first inner film (10) is laminated to each other except in an unlaminated area forming the channel or pocket portion (12).

19. Packaging material according to claim 1, wherein the second outer film (11) is a label (24) covering a region of the first inner film (10) smaller than the size of the first inner film.

20. Packaging material according to claim 19, wherein the label is sealed to the second surface of the first inner film along two mutually interspaced sealing lines so as to form a channel therebetween, the at least one outlet being formed at least one edge of the label.

21. Packaging material according to claim 19, wherein the label is sealed to the second surface of the first inner film along a closed sealing line, the at least one outlet opening being formed in the second outer film inside the closed sealing line.

22. Packaging material according to claim 20, wherein the label is sealed to the first inner film by adhesion.

23. Packaging material according to claim 19, wherein the label is of a rectangular outline with a length (L) and a width (W) each less than 100 mm.

24. Package for a product especially a food product, releasing gasses, wherein at least a part thereof is formed of a packaging material according to claim 1.

* * * * *